UNITED STATES PATENT OFFICE.

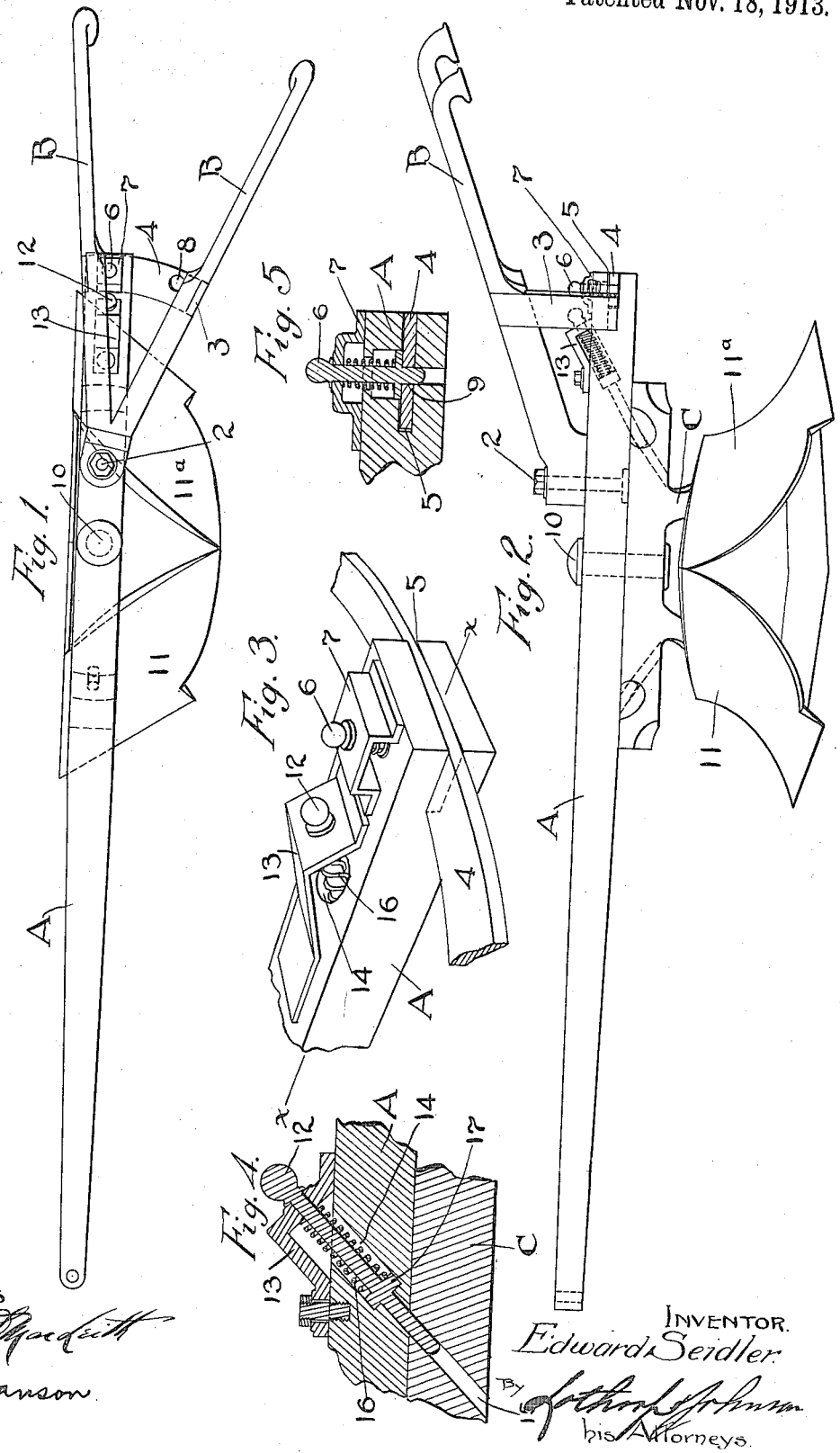
E. SEIDLER.
PLOW.
APPLICATION FILED AUG. 22, 1912.
1,078,644.
Patented Nov. 18, 1913.

EDWARD SEIDLER, OF NOWLIN, SOUTH DAKOTA.

PLOW.

1,078,644.  Specification of Letters Patent.  Patented Nov. 18, 1913.

Application filed August 22, 1912. Serial No. 716,429.

*To all whom it may concern:*

Be it known that I, EDWARD SEIDLER, a citizen of the United States, residing at Nowlin, in the county of Stanley and State of South Dakota, have invented certain new and useful Improvements in Plows, of which the following is a specification.

My invention relates to improvements in plows, its object being to provide an improved construction wherein the plow share is rotatably mounted in connection with the beam, so that the plow beam and share can be mutually adjusted to allow the cutting of furrows in opposite directions upon one side of the field.

To this end the invention consists in the features of construction, combination, and arrangement of parts hereinafter described and claimed.

In the accompanying drawings forming part of this specification, Figure 1 is a plan view of my improved invention; Fig. 2 is a side elevation of the same; Fig. 3 is a perspective view of the handle end of the plow beam showing a portion of the supporting handle; Fig. 4 is a section on line $x$—$x$ of Fig. 3 taken through the forward end of the portion of the plow beam shown in Fig. 3; and Fig. 5 is a section on line $x$—$x$ of Fig. 3 taken through the rear end of the plow beam.

Referring to the drawings A represents the plow beam and B the plow handle having pivotal support 2 at one end of the beam. The handle is formed with a downwardly projecting guide 3 having a horizontal portion 4 extending through a slot 5 in the corresponding end of the beam. In order to hold the handle in adjusted positions with reference to the beam I provide a pin 6 supported in the bracket 7 carried by the beam and adapted to extend through corresponding openings 8 and 9 in the guide 4 and beam. Having rotatable support 10 under the plow beam in front of the handle are the oppositely directed plow shares 11 and 12 supported by the frame C. In order to hold the plow shares in adjusted position with reference to the beam I provide the pin 12 slidably supported in the bracket 13 secured upon the beam, said pin being slidable through an inclined opening 14 in the beam and positioned to extend into a similar opening 15 in the supporting frame C of the plow shares. Similar openings 15 are formed in the opposite ends of the supporting frame of the plow shares to cause the pin to interlock with the plow share supported in reversed positions of the plow shares, to hold said plow shares in locked position, as shown in Fig. 2. The pin 14 is normally pressed down by a spring 16 interposed between the bracket 13 and flange 17 surrounding the pin.

In use, where the end of a furrow is reached, it is only necessary to release the pin 12 and swing the beam by means of the team around to point forwardly from the opposite plow share, and to angularly adjust the handle B to properly position the same with reference to the beam for the driver. I thus am enabled to plow back and forth upon one side of a field without being compelled to plow around the field as in the ordinary construction. By the use of my improved plow I am enabled to plow a field without forming a ridge in the center of the field as when the ordinary plow is used. I also secure a plow that is particularly efficient in side hill plowing.

I claim as my invention:

A plow of the class described comprising a beam, a pair of oppositely directed plow shares pivotally supported on one end of said beam, a spring pressed pin carried by said beam in position to interlock with said plow shares and hold the same in reversed positions, a handle pivotally supported on the end of said beam adjacent to said plow shares, and a spring pressed pin carried by said beam and interlocking with said handle to hold the same in angularly adjusted positions.

In testimony whereof I affix my signature in presence of two witnesses.

EDWARD SEIDLER.

Witnesses:
H. C. BATLY,
H. C. RUDIN.